Figure 1:
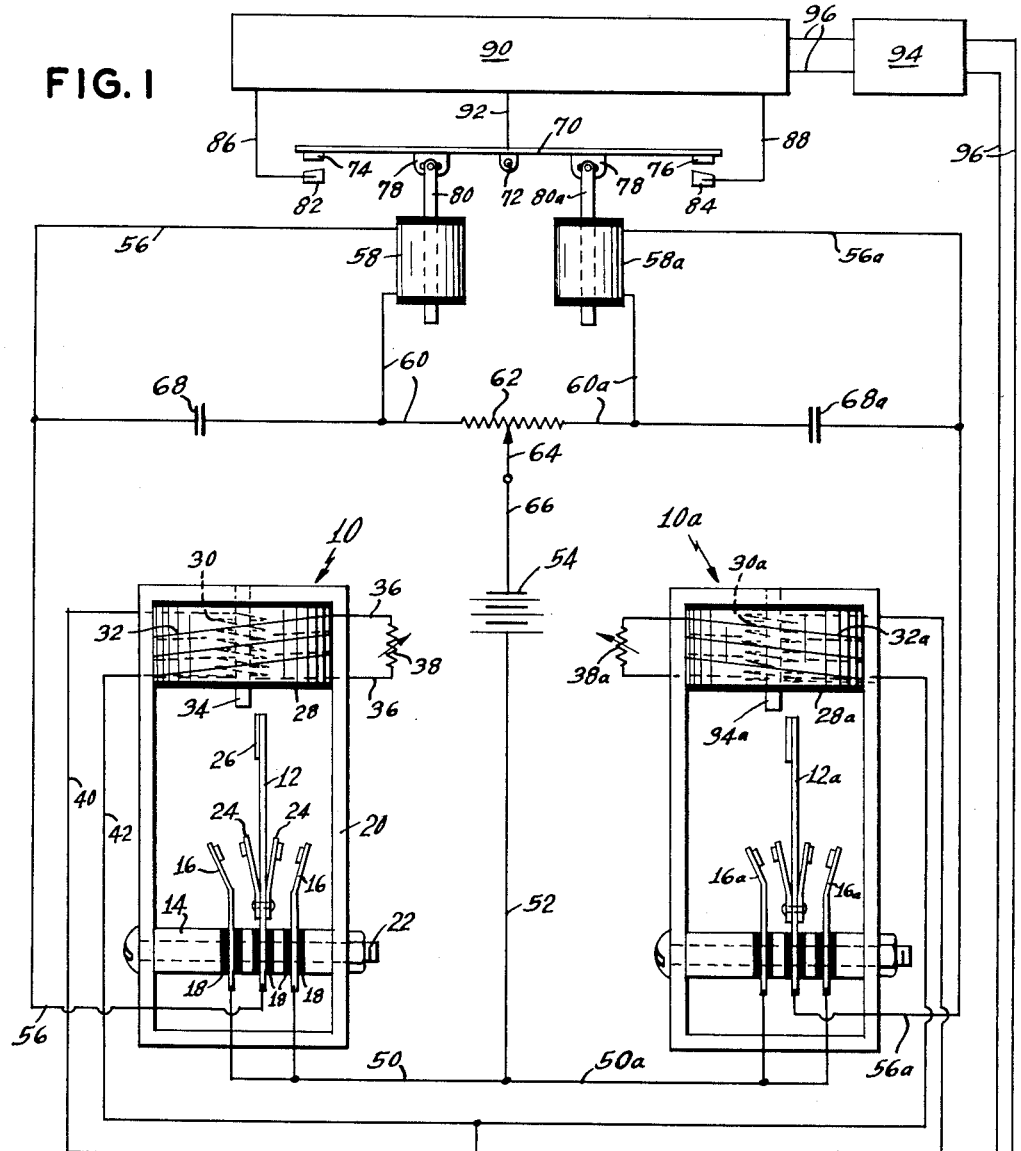

July 17, 1956

C. P. MOLYNEUX 2,755,417

ELECTRICAL NULL POINT CONTROL SYSTEM

Filed May 24, 1952

INVENTOR
Cecil Patrick Molyneux
BY
Dennis, Edmonds, Morton, Barrows and Taylor
ATTORNEYS

United States Patent Office 2,755,417
Patented July 17, 1956

2,755,417

ELECTRICAL NULL POINT CONTROL SYSTEM

Cecil Patrick Molyneux, Southampton, N. Y., assignor to Molyneux and Aspinwall, Inc., Port Washington, N. Y., a corporation of New York Application May 24, 1952, Serial No. 289,794

8 Claims. (Cl. 317—5)

My invention relates to improvements in electrical control systems and more particularly to a system for effecting the accurate control of a mechanism, engine or device between two specified limits or for maintaining the operation of a device or mechanism at a predetermined speed.

It is desirable in many instances to maintain internal combustion engines, generators, or other prime movers or mechanisms at a particular speed or frequency and to avoid a reduction or an increase in speed. In other instances, it is important to maintain the operation of controls and mechanisms at a constant rate of speed or on a predetermined course.

The primary object of the present invention is, therefore, to provide an electrical control system which is capable of effecting the control of various types of mechanisms and devices between specified limits of operation or movement.

A further object of the invention is to provide a control mechanism which is relatively inexpensive to manufacture and which may be readily connected into the prime mover or other mechanisms or devices to be controlled.

Another object of the invention is to provide a rugged control unit which is non-electronic and which is adapted to function without damage by shock or vibration.

Another object of the invention is to provide a control system of high precision, which is adapted to maintain the prime mover or other mechanism at a constant speed or in a predetermined condition of operation or motion.

The invention of my present application is an improvement upon the inventions disclosed in my pending applications Ser. No. 139,106, filed January 17, 1950, for "Electromechanical Speed Governor," now Patent No. 2,611,352, and Ser. No. 289,793 filed May 24, 1952, for "Speed Limit Control and Frequency Sensitive Sensor Therefor." In these applications, I have disclosed speed limit control systems or overspeed governors and a reed type frequency-responsive mechanism or control unit. The reed type frequency-responsive units disclosed in these pending applications comprise a tuned reed having a resonance frequency set at or corresponding to the desired governing speed of the engine or mechanism to be governed, the tuned reed being responsive to a frequency source derived from the engine or other mechanism to be governed, the reed being driven by an electromagnet receiving electric current from the frequency reference source and being operatively associated with a switch which is normally open but which is closed upon vibration of the reed at its predetermined tuned frequency.

In accordance with my present invention, I have discovered that an effective control system can be provided for controlling an engine or other mechanism and maintain it between specified speed limits by arranging two of the frequency-responsive reed units or sensors of the type disclosed in said applications in a bridge circuit including a battery or other source of power and a null seeking relay or power means. In this system, the sensors are arranged in a bridge circuit in opposition to each other, their electromagnets for driving the reeds being connected in parallel with the same frequency reference source, which in turn is advantageously derived from the prime mover or other device to be controlled. In this system, the reeds of the two sensors are tuned to different resonance frequencies, which are respectively slightly higher and lower than the reference frequency corresponding to the speed of the prime mover, engine, or other mechanism to be controlled.

In a preferred construction, one side of the normally-open switches of the two reed units are connected in parallel to one side of a battery or other source of power in the bridge circuit while the other side of the normally-open switches of the reed units are respectively connected into separate electric power or actuating means, such as electromagnets, these power means being connected in parallel through a potentiometer to the other side of the battery or power source. In this construction, the power or actuating means, or electromagnets are energized respectively by the two reed units and are arranged to act on opposite sides of a pivoted control member movable from a balanced position or null point to either of two controlling positions.

According to a particular construction, the electromagnets or power means actuated by the reed units comprise a part of a null-seeking relay in which the pivoted member is a beam acting on a fulcrum, the relay being either electrical or mechanical and arranged to operate a control circuit or mechanism for maintaining the engine or prime mover between specified speed limits.

The electrical control system of the present invention includes other features and advantages pointed out more in detail hereinafter in connection with a detailed description of an illustrative embodiment of the system as shown in the accompanying drawings forming a part of this application.

Figure 2:
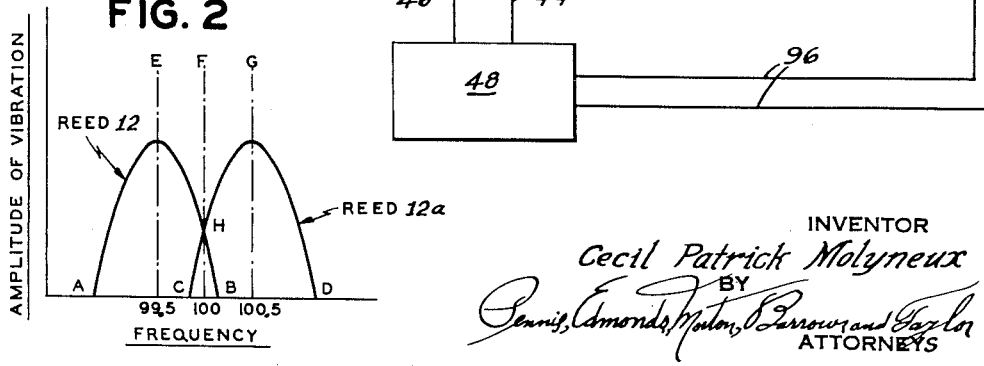

In the drawings:

Fig. 1 is a diagrammatic view in which the features of the present invention are illustrated; and Fig. 2 is a diagrammatic view in which the characteristics of the reed units are illustrated.

Referring to Fig. 1 of the drawings, the control system and bridge circuit therein shown includes two sensors or frequency-responsive reed units 10 and 10a. These sensors have exactly the same structure, except for the difference in the fundamental tuned frequency of their reeds. The reference characters applied to the sensor 10 will be the same for the sensor 10a, except that they will include the letter "a."

The sensor 10 includes a tuned spring metal reed 12, the lower portion of which is clamped in a mounting 14 between a pair of similar metal contact arms 16, all three elements being held rigidly in the mounting 14 and insulated from each other and the mounting by means of blocks of insulating material 18, as shown. The mounting 14, together with the elements 12 and 16, rigidly carried thereby, is rigidly set in the lower portion of a rectangular frame 20 of suitable material and secured therein by a bolt 22. The frame 20 preferably has the rectangular shape shown and is of relatively heavy rigid material. The reed 12 carries a pair of similar, oppositely-mounted contact arms 24 facing the contact arms 16, respectively, while the upper end of the reed 12 carries an armature 26.

The frequency sensing device or sensor 10 also includes an electromagnet 28 having primary and secondary windings 30 and 32, the winding 30 being inside the winding 32, directly surrounding a magnetically permeable metal core 34 fixed in the upper part of the frame 20 and extending below the windings to a position adjacent to the upper part of the armature 26 carried by the reed 12. The core 34 may be used to support the windings 30 and 32 on the frame 20, or the cover of the electromagnet 28 may be secured to the sides of the frame 20.

The primary winding 30 includes a considerable number of turns, preferably 2½ times the number of turns of the secondary winding 32. The secondary winding 32 is wound over the primary winding 30 and in the same direction, its terminals 36 being short circuited through a variable resistance or calibrating resistor 38. The secondary winding 32 provides a damping effect on the primary winding 30 and is particularly effective for producing a counteracting current in the electromagnet for suppressing vibration of the reed at subharmonic frequencies of its fundamental frequency. The sensors 10 and 10a may be used without the secondary windings, but they or equivalent means are advantageously included.

The terminals of the primary winding 30 are respectively connected by wires 40 and 42 and connecting wires 44 and 46, respectively, to a frequency reference source or device 48, which may be associated with the prime mover, engine, or other mechanism to be controlled. In the case of a spark ignition internal combustion engine, the device 48 may comprise the ignition circuit of the engine. In the case of a turbine, the device 48 may be the tachometer generator thereof. The primary winding 30a of the sensor 10a is connected into the frequency source or device 48 in parallel with the primary winding 30 of the sensor 10, as shown.

The sensors 10 and 10a are arranged in opposite sides of the bridge circuit shown in the drawing with the terminals of the contact arms 16 connected by wires 50 and 52 with one side of an electric battery or power source 54. The terminals of the contact arms 16a of the sensor 10a are connected by a wire 50a into the wire 52 and battery 54 in parallel with the corresponding contact arms of the sensor 10.

The lower end or terminal of the metal reed 12 is connected by a wire 56 into one terminal of the winding of an electromagnet 58, while the other terminal of the electromagnet 58 is connected by a wire 60 into one side of a potentiometer 62. The terminal of the metal reed 12a is connected by a wire 56a into one terminal of the winding of an electro-magnet 58a, while the other terminal of this electromagnet is connected by a wire 60a into the opposite side of the potentiometer 62. The same results are obtained if the wire 50 is connected to the reed 12 and wire 56 is connected to the contact arms 16.

The potentiometer 62 is provided in order to obtain an electrical balance in the system, by movement of a contact arm 64 to right or left along the potentiometer, the contact arm 64 being connected by a wire 66 into the terminal of the battery 54 opposite to the connection of the wire 52. In order to increase the sensitivity of the system, condensers 68 and 68a are shunted across the respective windings or coils of the electromagnets 58 and 58a. These condensers may be of a value suitable for electrically tuning their circuits and thereby aid in balancing the bridge circuit.

The electromagnets 58 and 58a advantageously have as nearly the same characteristics as possible, since they are operable in opposite sides of the bridge circuit and comprise a part of a null-seeking relay which includes a beam or bar 70 pivoted at its middle point on a pin or fulcrum 72 and provided with contacts 74 and 76 equally spaced from the fulcrum 72. The beam or bar may be a metallic electric conductor or include such a conductor which is insulated from its mounting on the fulcrum 72. The bar 70 carries equally spaced brackets 78, for example, of insulating material to which pole pieces 80 and 80a of the electromagnets 58 and 58a are respectively connected by a pivoted connection provided by the slots in the brackets 78.

The null-seeking relay also includes fixed contacts 82 and 84 cooperating respectively with contacts 74 and 76, the contacts 82 and 84 being respectively connected by wires 86 and 88 into a control circuit or mechanism 90, which is also connected into the beam 70 or the conductor thereof by a wire 92. The control circuit or mechanism 90 may be used to control the operation of a prime mover, internal combustion engine or other machine or mechanism indicated diagrammatically at 94, either by mechanical or electrical connections indicated at 96. Since the frequency reference for the source or device 48 is usually derived from the prime mover, the connection between the mechanism 94 and the device 48 is indicated by the wires 96, although the connection may be either electrical or mechanical. In some instances the mechanism 94 may include the equivalent of the device 48 and the wires 96 can be connected directly into the wires 44 and 46, respectively.

When the bridge system is in electrical balance, assuming, for example, that the reeds 12 and 12a are held in a position to close the reed switches, the pull of the electromagnets 58 and 58a on the beam 70 will be equal and neither of the contacts 74 and 76 will engage the fixed contacts of the relay. Under such conditions, if the mechanism 94 were in operation, it would be operating at the desired speed or operating condition. The prime mover, mechanism or engine 94 is maintained at the desired preselected speed by having the reeds 12 and 12a tuned to different resonance frequencies. For example, assuming that the reference frequency of the source 48 is 100 cycles per second at the desired speed of the prime mover or mechanism 94, the reed 12 may be adjusted to or have a tuned frequency of 99.5 cycles per second, while the reed 12a of the sensor 10a is adjusted to or has a tuned frequency of 100.5 cycles per second. Now when the mechanism 94 is operating under control of the bridge circuit of the present invention, both reeds 12 and 12a of the sensors 10 and 10a will be vibrating at the same amplitude as long as the frequency reference source 48 is at 100 cycles per second. When the reeds 12 and 12a are vibrating at the same amplitude, the length of dwell of the contact arms 24 and 24a on the respective fixed contact arms will be equal and the current flowing through the two sides of the bridge circuit, including the electromagnets 58 and 58a will be equal and, consequently, the beam 70 will remain in balance and not close with either of the fixed contacts 82 or 84. The relay, therefore, assumes a balanced null position.

If the mechanism 94 should tend to reduce its speed, the reference frequency of the source 48 would immediately fall slightly below 100 cycles per second, thereby unbalancing the bridge circuit, since the frequency would be nearer that of the tuned frequency of the reed 12 than of the tuned frequency of the reed 12a. Consequently, the time of dwell of the contact arms 24 on the fixed contact arms 16 would be longer because of the increased amplitude of the reed 12. At the same time, the time of dwell of the contacts of the switch of the reed 12a would be shorter. Therefore, more current would flow through the circuit of the sensor 10 than in the circuit of the sensor 10a, so that the electromagnet 58 would tilt the beam 70 causing the contact 74 to engage with the fixed contact 82, thereby providing a circuit through the wires 86 and 92 to the control mechanism 90 resulting in an increase in the speed of the mechanism or prime mover 94. As soon as the mechanism 94 reaches a speed corresponding to a frequency of 100 cycles per second in the source 48, the system will again come into balance and the relay controlled by the sensors of the bridge circuit will be opened. The operation is similar when the mechanism 94 tends to exceed the desired speed, at which time the relay closes a circuit through the wires 88 and 92, so that the control system or circuit 90 acts to reduce the speed of the mechanism 94.

While the reeds 12 and 12a are said to have a particular fundamental tuned frequency, they will nevertheless vibrate sufficiently to intermittently close their switch contacts over a small range of frequencies, for example, two or three or more cycles per second, according to their natural or controlled characteristics. Fig. 2 illustrates the vibration characteristics of the reeds 12 and 12a, in which their vibration curves are shown diagrammatically with "Amplitude Vibration" plotted against vibration "Frequency," the curves representing the amplitude ranges of the reeds which are sufficient to close their switch contacts. It has been found that as the amplitude of vibration of the reed increases, the time of dwell of the reed switch contacts increases correspondingly, resulting in a corresponding increase in the current flowing through the reed switch, and vice versa.

Considering the curves shown in Fig. 2, the range of frequencies over which the reed 12 vibrates sufficiently to close its switch contacts extends from A to B, while that for the reed 12a extends from C to D. The high points in the amplitude of the curves, corresponding to the middle points of the frequency ranges, at the vertical lines E and G, being the mechanical fundamental frequencies of the reeds. The time of dwell of the reed switch contacts will, therefore, be at a maximum at the middle of the vibration range corresponding to the maximum amplitude of vibration.

Where the two reeds 12 and 12a are tuned as closely as one cycle apart as in the illustrative example shown in Fig. 2, their vibration frequency ranges will overlap to the extent CB, as shown, while the middle points of their ranges and their maximum amplitudes of vibration will be one cycle apart. As a result, a rise or fall in the frequency, delivered by the source 48, from that of the mean of the tuned frequencies of the two reeds where the curves intersect on the vertical line F, at 100 cycles per second, will cause one of the reeds to vibrate at a greater amplitude than the other, since as the frequency changes the amplitude of vibration of the reeds will follow the curves shown in Fig. 2. For example, if it is assumed that the frequency at 48 decreases slight below 100 cycles per second, the amplitude of vibration of the reed 12 will increase along its curve toward the line E, while the amplitude of vibration of the reed 12a will decrease downwardly along its curve. As a result of this change, it will be seen that in a control operation the current supplied to the electromagnet 58 will increase while that supplied to the electromagnet 58a will decrease, causing the closing of the switch contacts 74 and 82 to energize the control 90 for bringing the mechanism 94 back toward its predetermined condition of operation corresponding to a frequency of 100 cycles per second at the source 48. When the amplitude of vibration of the reeds 12 and 12a reach the same point as at H on the vertical line F in Fig. 2, the system will be brought into balance.

While it is preferable that the vibration frequency ranges of the reeds overlap in the manner shown in Fig. 2, in order to effect a control of high precision, the control will be effective where the ranges do not overlap, since at the mean point, or in the space between the ranges neither reed switch will close, no current will be flowing in either side of the bridge circuit and the relay will be in neutral.

In the use of the control system of the present invention, it has been observed that an engine controlled thereby can be effectively controlled within specified desired limits. In such an operation, it has been noted that the control system functions gradually with the relay seeking its null or neutral position, for example, the beam 70 will remain in its null or neutral position for some time and then swing slowly over until the contacts on one side are closed for several seconds, after which they open and the beam assumes its neutral position for another period of time. The beam may then swing to close the opposite contacts for several seconds after which it moves gradually back to its neutral position.

While the potentiometer 62 may be normally employed to obtain an electrical balance in the system, it may also be used to control the vibration amplitude of the reeds 12 and 12a, in other words to create a predetermined desirable unbalance in the bridge circuit. The circuit may be balanced, or unbalanced without the use of the potentiometer by connecting the wire 66 at the proper point into the joined wires 60 and 60a, but the potentiometer is preferably included to facilitate the adjustment of the bridge circuit.

An additional sensor of the same construction as the sensors 10 and 10a may be introduced into each side of the bridge circuit and connected in parallel respectively with the sensors 10 and 10a. Such a sensor connected in parallel with the sensor 10 will have a reed with a still lower tuned or calibrated frequency so that it will act as an underfrequency control for the system. The additional sensor arranged in parallel with the sensor 10a will have a somewhat higher tuned frequency for its reed, so that it will act as an overfrequency control. These additional sensors would merely be used as a safety means in case the operator of mechanism 94 should willfully succeed in taking the mechanism above or below the predetermined speed, out of control of the sensors 10 and 10a. In some instances, an underfrequency sensor is desirable as, for example, to cut out an electric generator if the frequency of the current produced thereby should drop below a predetermined frequency.

While the null-seeking relay has been described in connection with electrical circuits connected into the control 90, it is to be understood that the beam 70 or an equivalent member or means actuated by the electromagnets 58 and 58a, or their equivalent, may be employed as a mechanical actuating means for operating a mechanism or control to maintain such mechanism or control within specified limits of movement or operation. The null-seeking relay may be used to electrically or mechanically control various types of mechanisms or engines, maintain the course or movement of ships, aircraft, or vehicles, or to maintain a predetermined condition of a mechanism or system. While the electromagnets 58 and 58a constitute suitable power means for many purposes, it is to be understood that other power means or current-responsive means may be used in the bridge circuit and the null-seeking relay.

The present invention not only includes a novel control system having many uses, but also includes a novel bridge circuit, which may be used in other circuits and systems, the bridge circuit including the opposing sensors 10 and 10a for automatically regulating the current flowing through the opposite sides of the bridge circuit. The components of the system and bridge circuit are rigid and not subject to the disadvantages encountered where electronic tubes are employed. The control system is readily connected into the mechanism to be controlled in a matter of minutes.

In some instances, the bridge circuit and the control system may be useful for control purposes where the reeds of the sensors in the opposite sides of the bridge circuit have the same or different fundamental frequencies where such reeds are vibrated from separate frequency sources responsive to separate mechanisms which are to be brought into synchronism or related operation. In such cases, an underfrequency relay may be arranged in parallel with one sensor, while an overfrequency relay is arranged in parallel with the other sensor. The null-seeking relay operatively associated with the bridge circuit may be used in such cases to regulate the speed or operation of both mechanisms.

Where the vibration frequency ranges of the reeds in the bridge circuit mechanism does not overlap, or in any case the beam of the null-seeking relay may be provided with light springs or equivalent means tending to bias the beam to its balanced neutral position. Other changes may be made in the control system and bridge circuit without departing from the scope of the present invention as defined by the appended claims.

I claim:

1. A control system comprising an electrical bridge circuit having two opposite sides, a source of electricity connected across the bridge circuit between the opposite sides thereof, each side of the bridge circuit including a frequency sensor having a tuned reed adapted to be vibrated over a preselected vibration frequency range, an electrically-operable means mounted adjacent each reed for effecting its vibration at its tuned frequency, each frequency sensor including a normally-open electric switch in its said side of the bridge circuit actuated by the reed of said frequency sensor and arranged to be intermittently closed by the vibration of the reed in its vibration frequency range, the reeds of the sensors in the opposite sides of the bridge circuit having different preselected vibration frequency ranges, a frequency reference source of electric current having a frequency normally between those of the reeds, means for conducting electric current of variable frequency from said source in parallel to the electrically-operable means associated with the reeds of said frequency sensors in opposite sides of the bridge circuit, a null-seeking relay including a member adapted to be actuated from a null position to either of two control positions, an electrical actuating means in each side of the bridge circuit in series with the normally-open switch therein and energizable by electric current flowing through said side of the bridge circuit when said normally-open switch therein is closed, said electrical actuating means in the opposite sides of said circuit being respectively operatively connected with the opposite sides of said member for actuating said member to said two positions, and a control means actuated by said member when it is actuated to either of said two positions, said frequency reference source being responsive to the actuation of said control means.

2. In a control system for controlling the operation of a mechanism between specified control limits, including an electric bridge circuit having two opposite sides, a source of electricity for the bridge circuit connected across the circuit between the opposite sides thereof, a frequency sensor for each side of the bridge circuit including a normally-open electric switch in said side of the bridge circuit, each sensor including a tuned reed for actuating said switch and adapted to be vibrated over a preselected narrow vibration frequency range to intermittently close said switch, an electrically-operable means located adjacent each reed for effecting its vibration sufficiently over its vibration range to intermittently close said normally-open switch, the reeds of the sensors of the opposite sides of the bridge circuit having different closely related preselected vibration frequency ranges, a frequency reference source of electric current having a frequency proportional to the operating conditions of said mechanism to be controlled and normally between those of said reeds, means for conducting electric current from said frequency source in parallel to the electrically-operable means associated with the reeds of the frequency sensors of the opposite sides of the bridge circuit, a null-seeking relay including a member adapted to be actuated from a null position to either of two control positions for maintaining said mechanism within the specified limits of operation, an electrical actuating means in each side of the bridge circuit in series with the normally-open switch therein and energizable by electric current flowing through said side of the bridge circuit when said normally-open switch therein is closed, said electrical actuating means in the opposite sides of the bridge circuit being respectively operatively connected with the opposite sides of said member for actuating said member to said two positions, a control means for controlling said mechanism between said specified limits, and means responsive to the actuation of said member for actuating said control means when said member in turn is actuated to either of said two positions by the electrical actuating means of the bridge circuit.

3. In a control system, an electrical bridge circuit having opposite sides for conducting electric current, a source of electricity for said circuit the respective terminals of which are connected into the opposite ends of said sides in parallel, each side of the bridge circuit including a frequency sensor having a tuned reed adapted to be vibrated at a preselected tuned frequency and a normally-open electric switch in its side of the bridge circuit, the reeds of the sensors of the opposite sides of the bridge circuit having different preselected vibration frequency ranges, each reed including means for contacting the switch associated therewith and adapted to intermittently close the switch upon vibration of the reed at its tuned frequency, an electrically-operable means mounted adjacent each reed for effecting its vibration at its tuned frequency, means for conducting electric current of variable frequency normally between those of the reeds to the electrically-operable means associated with each reed for effecting its vibration, and an electrical actuating means in each side of the bridge circuit in series with the normally-open switch therein adapted to be energized by electric current flowing therethrough from said source when said switch therein is closed on the vibration of the reed at its preselected frequency.

4. A control system as claimed in claim 3 in which the electrically-operable means for both reeds are connected in parallel with the means for conducting electric current of variable frequency.

5. In a control system, an electrical bridge circuit having opposite sides for conducting electric current, two current supply leads connected respectively into the opposite ends of said sides in parallel, each side of the bridge circuit including a frequency sensor having a tuned reed adapted to be vibrated at a preselected frequency and a normally-open electric switch in its side of the bridge circuit associated with the reed therein, said switch being controlled by the reed and adapted to be intermittently closed by the reed on vibration of the reed at its tuned frequency, an electromagnet mounted adjacent said reed for effecting its vibration at its tuned frequency, means for conducting electric current of variable frequency normally between those of the reeds in parallel to the electromagnets associated with the reeds of both frequency sensors for effecting their vibration, an electromagnet in each side of the bridge circuit in series with the normally-open switch therein adapted to be energized by electric current flowing therethrough when said switch is closed on the vibration of the reed at its preselected frequency, and a movable control member responsive to the energization of the electromagnets in the opposite sides of the circuit, the reeds of the sensors in the opposite sides of the circuit having different closely related preselected tuned frequencies.

6. A control system as claimed in claim 1, in which the frequency ranges of the reeds of the sensors are overlapping.

7. A control system as claimed in claim 5, in which the control member is pivoted on a balancing pivot and in which the electromagnets on the opposite sides of the bridge circuit have a similar characteristic and are connected on the opposite sides of the pivot of said control member, whereby said control member is maintained in a balanced null position when the reeds of the sensors in the opposite sides of said circuit are vibrating at the same frequency.

8. A control system as claimed in claim 2, in which the reeds in the opposite sides of the circuit have overlapping frequency ranges and are therefore adapted to vibrate at a common frequency, and in which the electrical actuating means in the opposite sides of the circuit each include an electromagnet, said electromagnets being electrically connected into the opposite sides of said member, said electromagnets having similar characteristics whereby said member is maintained in its null position when the reeds in the opposite sides of the circuit are vibrated at the same frequency.

References Cited in the file of this patent

UNITED STATES PATENTS

| | | |
|---|---|---|
| 1,860,285 | Gunn | May 24, 1932 |
| 1,917,295 | Dryer | July 11, 1933 |
| 2,105,134 | Wintsch | Jan. 11, 1938 |
| 2,340,798 | Deal | Feb. 1, 1944 |
| 2,544,523 | Bogdanoff | Mar. 6, 1951 |

FOREIGN PATENTS

| | | |
|---|---|---|
| 623,970 | Great Britain | May 25, 1949 |